United States Patent [19]
Yao et al.

[11] Patent Number: 5,571,492
[45] Date of Patent: *Nov. 5, 1996

[54] COMPOSITE OXIDE HAVING OXYGEN ABSORBING AND DESORBING CAPABILITY

[75] Inventors: Shinya Yao, Osaka-fu; Hideo Yokoi; Tadatoshi Murota; Kazuhiro Yamamoto; Shigeru Aozasa, all of Hyogo-ken, Japan

[73] Assignee: Santoku Metal Industry Co., Ltd., Hyogo-ken, Japan

[*] Notice: the term of this patent shall not extend beyond the expiration date of Pat. No. 5,478,543.

[21] Appl. No.: 537,628

[22] Filed: Oct. 2, 1995

Related U.S. Application Data

[63] Continuation-in-part of Ser. No. 263,608, Jun. 20, 1994, Pat. No. 5,478,543.

[30] Foreign Application Priority Data

Oct. 5, 1994 [JP] Japan .................. 6-241661

[51] Int. Cl.⁶ .......................... C01F 17/00; C01B 13/00
[52] U.S. Cl. .......................... 423/263; 423/579; 502/304
[58] Field of Search ................ 423/579, 593, 423/263; 502/304

[56] References Cited

U.S. PATENT DOCUMENTS

| 5,019,366 | 5/1991 | Sakai ................ | 423/579 |
| 5,292,496 | 3/1994 | Nagashima et al. ...... | 502/303 |

FOREIGN PATENT DOCUMENTS

| 103026 | 6/1985 | Japan ................ | 423/263 |
| 166222 | 8/1985 | Japan ................ | 423/263 |
| 23213 | 1/1991 | Japan ................ | 423/263 |

*Primary Examiner*—Wayne Langel
*Attorney, Agent, or Firm*—Darby & Darby, P.C.

[57] ABSTRACT

A composite oxide having oxygen absorbing and desorbing capability contains 4.99–98.99% by weight of cerium oxide, 1–95% by weight of zirconium oxide and 0.01–20% by weight of hafnium oxide. The composite oxide includes Φ' phase as a crystal phase and has oxygen absorbing and desorbing capability of at least 100 µmol/g at 400° to 700° C.

6 Claims, 6 Drawing Sheets

Z50 : Example 1
Z60 : Example 2
Z65 : Example 3
Z80 : Example 4

COMPOSITE OXIDE HAVING OXYGEN ABSORBING AND DESORBING CAPABILITY

CROSS-REFERENCE TO RELATED APPLICATION

This application is a continuation-in-part application of application Ser. No. 08/263,608 filed Jun. 20, 1994, U.S. Pat. No. 5,478,543.

BACKGROUND OF THE INVENTION

This invention relates to a composite oxide having a novel crystal structure and exhibiting particularly excellent oxygen absorbing and desorbing capability which is utilizable for functional ceramics and for a catalyst for purifying exhaust gases.

Cerium oxide has hitherto been employed in large quantities as ceramics or as catalysts for purifying exhaust gases. In the field of catalysts, for example cerium oxide is used for enhancing the purification rate of exhaust gas components such as hydrocarbons, carbon monoxide and $NO_x$, taking advantage of its characteristic properties of absorbing oxygen in an oxidative atmosphere and desorbing oxygen in a reducing atmosphere. In the field of ceramics, cerium oxide is used in the form of compounds or mixtures with other elements as electrically conductive ceramics, such as solid electrolytes, taking advantage of its characteristic properties mentioned above. Such cerium oxide heretofore known is usually prepared, for example by adding oxalic acid or ammonium bicarbonate to a solution of nitrate or chloride of cerium, filtering and washing the resultant precipitate and drying followed by calcining.

However, the composite oxide prepared by the above method predominantly composed of cerium oxide has a drawback that it is incapable of sufficiently absorbing and desorbing oxygen at 400° to 700° C., and is deteriorated in performance after heating to a higher temperature, even though it exhibits the oxygen absorbing and desorbing capability.

Up to now, cerium-zirconium composite oxide exhibiting high oxygen absorbing and desorbing capability is known and disclosed in Japanese Laid-Open Patent Application No.5-105428 (1993). Detailed scrutiny into the crystal structure of such oxide by Comparative Examples given hereinbelow has revealed that the structure is a mixed phase of a $CaF_2$-related structure phase, an h-tetragonal phase and a monoclinic phase (see FIG. 6). On the other hand, a tetragonal Φ phase has been known as a crystal phase (V. Longo and D. Minichelli, J. Amer. Ceramic Soc., 56(1973), 600.; P. Duran, M. Gonzalez, C. Moure, J. R. Jurado and C. Pascual, J. Materials Sci., 25(1990), 5001). It is reported that the Φ phase is formed after annealing at 993K for several months, and that equal amounts of h-tetragonal phase and $CaF_2$-related structure phase are contained in the formed Φ phase. It is also reported in the above literature that this Φ phase is decomposed at elevated temperatures. That is, researches are currently conducted for composite oxides exhibiting various oxygen absorbing and desorbing capability based upon difference in the crystal structure, and development of composite oxides exhibiting more excellent oxygen absorbing and desorbing capability has been desired.

SUMMARY OF THE INVENTION

It is therefore an object of the present invention to provide a novel composite oxide exhibiting superior oxygen absorbing and desorbing capability and containing cerium oxide, zirconium oxide and hafnium oxide, and Φ' phase as a crystal phase.

The above and other objects of the present invention will become apparent from the following description.

According to the present invention, there is provided a composite oxide having oxygen absorbing and desorbing capability, which comprises 4.99–98.99% by weight of cerium oxide, 1–95% by weight of zirconium oxide and 0.01–20% by weight of hafnium oxide, the composite oxide including Φ' phase as a crystal phase and having oxygen absorbing and desorbing capability of at least 100 μmol/g at 400° to 700° C.

PREFERRED EMBODIMENTS OF THE INVENTION

The present invention will now be explained in more detail hereunder.

The composite oxide of the present invention exhibiting oxygen absorbing and desorbing capability contains, as indispensable components, 4.99–98.99% by weight of cerium oxide, 1–95% by weight of zirconium oxide and 0.01–20% by weight of hafnium oxide. If the proportion of each component is outside of such range, the composite oxide is unable to display excellent oxygen absorbing and desorbing capability. It is also possible for the composite oxide to contain an additional metal oxide in addition to the above indispensable components. Examples of such additional metal oxide include titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, and mixtures thereof. Preferably, the proportion of the additional metal oxide is 10% by weight or less based on the total weight of the composite oxide of the present invention.

The composite oxide of the present invention exhibits oxygen absorbing and desorbing capability of not less than 100 μmol/g, preferably in a range of from 100 μmol/g to 1200 μmol/g and more preferably 150 μmol/g to 1200 μmol/g at a temperature range of 400° to 700° C. Such oxygen absorbing and desorbing capability results from changes in valency of cerium in the composite oxide from 4 at the time of fabrication to 3 upon heating under deoxidation conditions, e.g. in a hydrogen stream. The zirconium and hafnium components contained in the composite oxide promote the oxygen absorbing and desorbing capability and the valency thereof is constant at 4.

Figure 3:
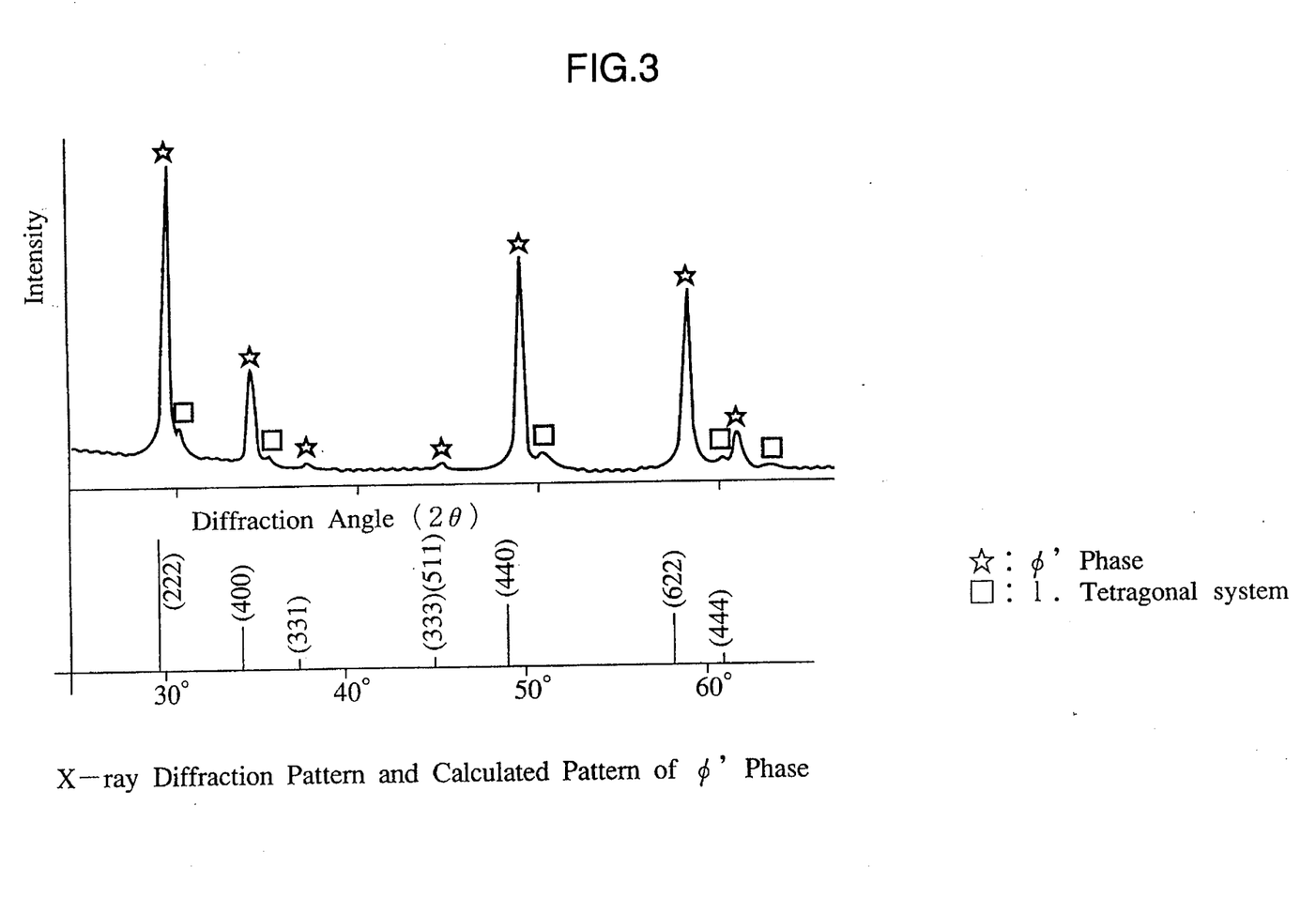
FIG. 3 is a graph showing an X-ray diffraction pattern of the composite oxide synthesized in the Example 6 and a calculated pattern of the Φ' phase.

The composite oxide of the present invention has a Φ' phase which is a novel crystal structure not reported to date. This Φ' phase is comprised of 8 units of the $CaF_2$-related structure and has a lattice parameter about twice that of a crystal structure not having the Φ' phase. For example, a lattice parameter of $ZrO_2$-$CeO_2$ having no Φ' phase is 0.51–0.53 nm, whereas that of $ZrO_2$-$CeO_2$ having Φ' phase is 1.02–1.06 nm. The Φ' phase is a crystal structure showing peaks in the (222), (400), (331), (333), (511), (440), (622) and (444) planes of the calculated X-ray diffraction pattern. The calculation of X-ray diffraction pattern is described in B. D. Cullity "Summary of X-Ray diffraction, New Edition" issued from KK AGNE and translated by Gentaro Matsumura (1983). However, in identifying this Φ' phase, it may occur that the peak values of the (331), (333) and (511) planes in the X-ray diffraction pattern are small depending on the composition such that the peaks in these planes do not appear clearly in case of weak sensitivity in the X-ray diffraction pattern. Without the presence of these peaks, the Φ' phase can be identified by the other large peaks mentioned above. Although the above-mentioned tetragonal Φ' phase is known as an analogous phase, this Φ' phase is found to be different from the Φ' phase as will become apparent by comparing the X-ray diffraction pattern and the calculated X-ray diffraction pattern shown in FIG. 3 with those of FIG. 4 as explained subsequently. In sum, the composite oxide of the present invention is a hitherto unknown oxide having the novel Φ' phase.

The composite oxide of the present invention may be prepared by producing a primary composite oxide and subsequently subjecting the primary oxide to heating-deoxidation and heating-oxidation.

For producing the primary composite oxide, a solution containing cerium, zirconium and hafnium ions and, if necessary, additional metal ions for forming the aforementioned additional metal oxides, are mixed with an aqueous ammonia solution, an aqueous ammonium bicarbonate solution or an aqueous oxalic acid solution in order to prepare a compound salt precipitate containing at least cerium, zirconium and hafnium. The solution containing cerium, zirconium and hafnium ions may be prepared by mixing an aqueous solution of cerium nitrate and an aqueous solution of zirconium nitrate and hafnium nitrate. If necessary, a solution containing ions of titanium, tungsten, nickel, copper, iron, aluminum, silicon, beryllium, magnesium, calcium, strontium, barium, rare earth metals other than cerium or mixtures thereof may also be added.

The concentration of the solution containing cerium, zirconium and hafnium ions is in a range preferably of 30 to 200 g/liter and more preferably of 50 to 100 g/liter in terms of the primary composite oxide containing the above ions. The mixing ratio of the cerium ion, the zirconium ion, the hafnium ion and the optionally added other metal ions is 4.99–98.99 : 1–95 : 0.01–20 : 0–10 in terms of weight ratio of oxides of the respective ions.

The concentration of the aqueous ammonia solution mixed with the solution containing at least the cerium, zirconium and hafnium ions is preferably 1–2N and more preferably 1–1.5N. The concentration of the aqueous ammonium bicarbonate solution mixed with the solution containing at least the cerium, zirconium and hafnium ions is preferably 50 to 200 g/liter and more preferably 100 to 150 g/liter, while that of the aqueous oxalic acid solution mixed with the solution containing at least the cerium, zirconium and hafnium ions is preferably 50–100 g/liter and more preferably 50 to 60 g/liter. The mixing ratio of the solution containing at least the cerium, zirconium and hafnium ions to the aqueous ammonia solution, the aqueous ammonium bicarbonate solution or the aqueous oxalic acid solution is preferably 1:1 to 1:10 in weight ratio. The compound salt precipitate produced at this time may, for example be a compound hydroxide or a compound carbonate.

A primary composite oxide may be produced by calcining the compound salt precipitate at a temperature of 300° C. or higher, preferably at 300° to 1000° C. for 1 to 10 hours. The compound salt precipitate may also be hydrothermally processed prior to the calcining step. The hydrothermal processing may usually be carried out using an autoclave or the like. The temperature and the processing time for the hydrothermal processing are preferably 100° to 135° C. and 0.5 to 1 hour, respectively.

The primary composite oxide may also be produced by the following method. Specifically, cerium oxide, zirconium oxide, hafnium oxide or hafnium-containing zirconium oxide and optionally the additional metal oxide are weighed to have a ratio of 4.99–98.99% by weight of cerium oxide, 1–95% by weight of zirconium oxide, 0.01–20% by weight of hafnium oxide and 0–10% by weight of the additional metal oxide, and are mixed uniformly. For mixing, a conventional ball mill is preferably employed. The uniformly mixed oxides are molded to form pellets by a compression molding device under a pressure preferably of 200 to 1000 kg/cm² and sintered under heating at 700° to 1500° C. for 1 to 10 hours. The sintered product is then taken out and crushed by a crusher, such as a ball mill, to have a particle size preferably of 1.0 to 100 μm, to give a primary composite oxide.

The primary composite oxide is then subjected to heating-deoxidation. Preferably, the primary composite oxide is freed of impurities deposited thereon before proceeding to the heating-deoxidation. These impurities may be removed by charging the primary composite oxide in a vacuum heating oven, introducing an oxygen gas or the like into the oven after evacuating the inside of the oven to vacuum, and maintaining the composite oxide at a temperature of preferably 200° to 1000° C. for 0.5 to 10 hours.

The heating-deoxidation is preferably carried out by charging the primary composite oxide into a vacuum heating oven, introducing a reducing gas, such as hydrogen or carbon monoxide into the oven after evacuating the inside of the oven to vacuum and heating the composite oxide preferably at a temperature of 600° to 1000° C. for 0.5 to 10 hours. If necessary, a reducing gas may be introduced into the oven at the time of heating. The reducing gas employed may be diluted with an inert gas. The reducing gas at this time is preferably of a concentration of not less than 1% by volume. The primary composite oxide may also be subjected to heating-deoxidation by mixing the primary composite oxide with a reducing agent, such as carbon powders, and heating the resulting mixture preferably at 800° to 1300° C. for 1 to 10 hours. The mixing amount of the reducing agent is preferably 1 to 1.5 equivalent of the amount of cerium in the primary composite oxide.

After the heating-deoxidation, heating-oxidation is carried out for producing the composite oxide having the Φ' phase according to the present invention. The heating-oxidation may be carried out by re-evacuating the inside of the oven to vacuum after the heating-deoxidation for removing any residual reducing gas, introducing air or an oxygen gas into the oven, and heating the composite oxide in an atmosphere of the oxidizing gas at a temperature of 600° to 850° C. for 0.5 to 10 hours. If necessary, an oxidizing gas may be introduced into the inside of the oven during heating.

The heating-deoxidation and the heating-oxidation may be repeated two or three times.

Since the composite oxide of the present invention contains cerium oxide, zirconium oxide and hafnium oxide as indispensable components, and a novel Φ' phase as a crystal phase, it displays oxygen absorbing and desorbing capability of not less than 100 μmol/g in a temperature range of 400° to 700° C. Thus, the composite oxide of the present invention is highly useful as a substitute for conventional cerium oxide and cerium-zirconium composite oxide in the field of catalysts and functional ceramics.

EXAMPLES OF THE INVENTION

The present invention will be explained with reference to Examples and Comparative Examples which are merely illustrative and are not intended for limiting the present invention.

Example 1

97 ml of an aqueous solution of cerium nitrate in terms of a cerium oxide concentration of 300 g/liter prepared by dissolving a high purity cerium nitrate solution (manufactured by SANTOKU METAL INDUSTRY CO., LTD. with a purity of 99.9%) in water, 55 ml of an aqueous solution of zirconium nitrate in terms of a concentration of zirconium oxide of 25% by weight prepared by dissolving a zirconium nitrate solution (manufactured by DAIICHI KIGENSO KAGAKU KOGYO CO., LTD. with a purity of 99.9%) in water and 24 ml of an aqueous solution of hafnium nitrate in terms of a hafnium oxide concentration of 10 g/liter prepared by dissolving hafnium nitrate (manufactured by WAKO PURE CHEMICAL INDUSTRIES LTD. with a purity of 97%) in water were mixed to produce an aqueous solution containing cerium, zirconium and hafnium ions having the Ce:Zr:Hf weight ratio of 89.7:10:0.3 and the concentration of the composite oxide of 50 g/liter. To 1 liter of the resulting solution was added 1 liter of a separately prepared aqueous solution of ammonium bicarbonate with a concentration of 150 g/liter to give a precipitate of a compound carbonate containing cerium, zirconium and hafnium. The compound carbonate thus produced was calcined at 300° C. for 5 hours to produce 50 g of a primary composite oxide containing cerium, zirconium and hafnium.

Figure 1:
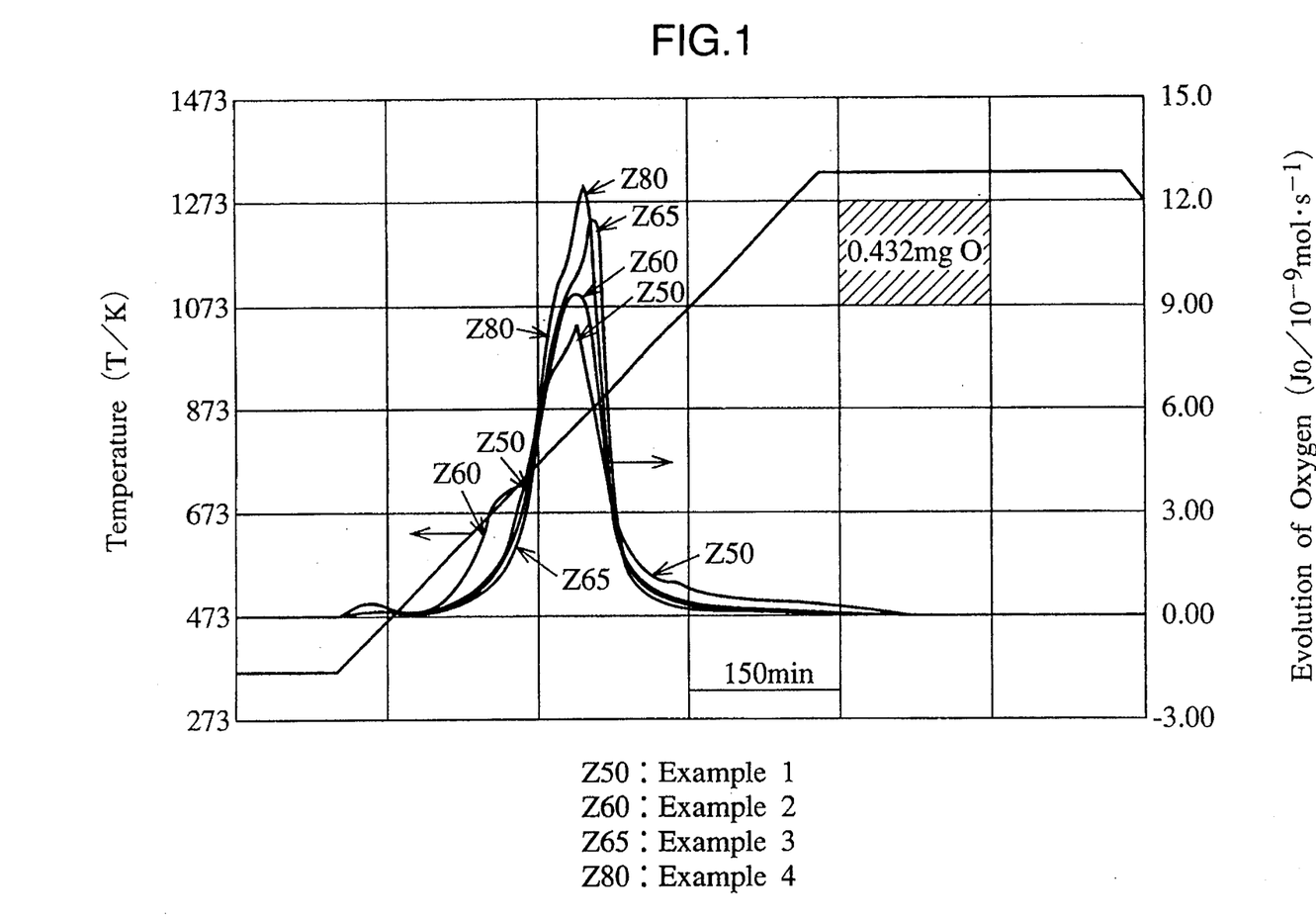
FIG. 1 is a graph showing the oxygen absorbing and desorbing capability of the composite oxides synthesized in Examples 1 to 4.
Figure 2:
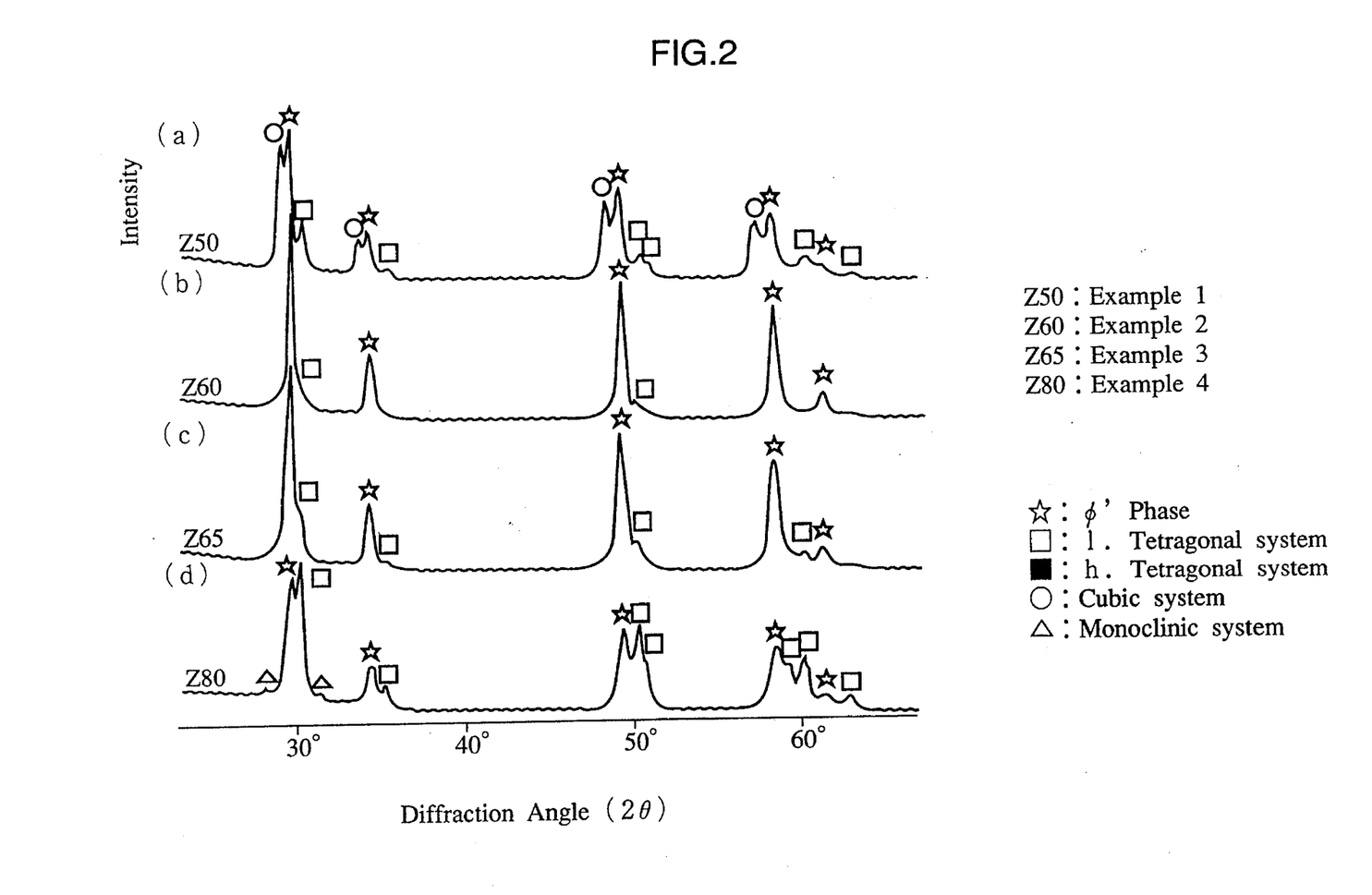
FIG. 2 is a graph showing X-ray diffraction patterns of the composite oxides synthesized in the Examples 1, 2, 3 and 4, respectively.

The primary composite oxide was charged in a vacuum heating oven which was then evacuated to vacuum. The primary composite oxide was then heated to and maintained at 900° C. for one hour as a pure oxygen gas was introduced for removing impurities affixed thereto. The oven was again evacuated to vacuum, while the temperature was lowered to 100° C. After the oxygen gas was removed, the primary composite oxide was heated at 1000° C. for 5 hours as an argon gas-diluted 10% hydrogen gas was introduced. The temperature was then lowered to 600° C. After evacuating the oven to vacuum, an oxygen gas was introduced into the heating oven and heating was then carried out at 600° C. for 5 hours for synthesizing the composite oxide. The oxygen absorbing and desorbing characteristic properties were then measured of the produced composite oxide using an electrochemical oxygen pump type closed system oxygen analyzer disclosed in Shinya Yao and Zensaku Kozuka, Detection of the Phase Transitions of in Praseodymium Oxide Thin Film by a Closed System Potentiostatic Technique Employing a Solid Electrolyte, Journal of the Electro-Chemical Society of Japan, 61 No.2, p262 (1993). The results are shown in FIG. 1 (see Z50). The values of the absorbed and desorbed quantities of oxygen as read from FIG. 1 are shown in Table 1. Analyses of the crystal structure of the produced composite oxide with an X-ray diffraction apparatus manufactured by SHIMADZU CORP., revealed that the crystal structure had Φ' phase. The results are shown in FIG.2 (see (a), Z50). Measurements of the composition of the produced composite oxide indicated the composition of 58.16% by weight of cerium oxide, 41.35% by weight of zirconium oxide and 0.49% by weight of hafnium oxide.

Example 2

A composite oxide was produced in the same way as in Example 1 except changing the composition of the starting components so that the composition was composed of 48.10% by weight of cerium oxide, 51.30% by weight of zirconium oxide and 0.60% by weight of hafnium oxide. The results are shown in FIGS. 1 and 2 (see Z60 in FIG. 1 and (b) Z60 in FIG. 2) and in Table 1, as in Example 1.

Example 3

21.4 g of cerium oxide manufactured by SANTOKU METAL INDUSTRY CO., LTD. with a purity of 09.9%, and 28.6 g of zirconium oxide containing 1.17% by weight of hafnium oxide manufactured by SANTOKU METAL INDUSTRY CO., Ltd. with a purity of zirconium oxide of 98.83% by weight, were mixed in a ball mill and compression-molded by a compression molding device under a molding pressure of 500 kg/cm$^2$ to form pellets which were then sintered in an atmosphere at 1500° C. for 5 hours. These pellets were crushed in a ball mill to give a primary composite oxide. The resulting primary composite oxide was charged in a vacuum heating oven, as in Example 1. After evacuating the oven to vacuum, the primary composite oxide was heated to 900° C. and maintained at this temperature for one hour under introduction of the oxygen gas for removing affixed impurities. After lowering the temperature to 100° C. and again evacuating the oven to vacuum, the oxygen gas was removed and the primary composite oxide was heated at 1000° C. for 5 hours as an argon gas-diluted 10% hydrogen gas was introduced into the oven. After lowering the temperature to 600° C. and again evacuating the oven to vacuum, the primary composite oxide was heated at 600° C. for 5 hours as the oxygen gas was introduced into the oven for synthesizing the composite oxide.

The oxygen absorbing and desorbing properties were measured of the produced composite oxide as in Example 1. The amount of absorbed and desorbed oxygen was read from FIG. 1. The absorbed and desorbed amounts of oxygen read from FIG. 1 are shown in Table 1. Analyses of the crystal structure conducted in the same way as in Example 1, indicated the presence of Φ' phase. The results are shown in FIG. 2 (see (c) Z65). Measurements of the composition of the produced composite oxide indicated the composition of 42.81% by weight of cerium oxide, 56.52% by weight of zirconium oxide and 0.67% by weight of hafnium oxide.

Example 4

A composite oxide was produced in the same way as in Example 3 except changing the composition of the starting components so that the composition of the composite oxide was 25.79% by weight of cerium oxide, 73.35% by weight of zirconium oxide and 0.86% by weight of hafnium oxide. The results are shown in FIGS. 1 an 2 (see Z80 in FIG. 1 and (d), Z80 in FIG. 2) and in Table 1, as in Example 3.

Example 5

79 ml of an aqueous solution of cerium nitrate prepared in Example 1, 68 ml of an aqueous solution of zirconium nitrate in terms of a zirconium oxide concentration of 25% by weight prepared by dissolving in water a zirconium nitrate solution containing 1.17% by weight of hafnium based on the total weight of zirconium, and 8 ml of an aqueous solution of yttrium nitrate in terms of a yttrium oxide concentration of 100 g/liter prepared by dissolving in water yttrium nitrate manufactured by SANTOKU METAL INDUSTRY CO., LTD. with a purity of 99.9% were mixed to produce a solution containing cerium, zirconium, hafnium and yttrium ions having the Ce:Zr:Hf:Y weight ratio of 49.9:47.8:0.7:1.6 and the concentration of the composite oxide of 50 g/liter. 50 g of a primary composite oxide were produced in the same way as in Example 1.

The primary composite oxide was charged in a vacuum heating oven which was then evacuated to vacuum. The composite oxide was then heated to 900° C. and maintained at this temperature for one hour as a pure oxygen gas was introduced for removing impurities affixed thereto. The oven was again evacuated to vacuum after the temperature was lowered to 100° C. After the oxygen gas was removed and an argon gas-diluted 10% hydrogen gas was introduced, the composite oxide was heated at 900° C. for 5 hours. The temperature was then lowered to 600° C. After evacuating the oven to vacuum, an oxygen gas was introduced into the heating oven and heating was then carried out at 600° C. for 5 hours for synthesizing the composite oxide.

The oxygen absorbing and desorbing properties were measured of the resulting composite oxide in the same way as in Example 1. The results are shown in Table 1. X-ray diffraction of the crystal structure conducted in the same way as in Example 1 showed the presence of Φ' phase. The composition of the composite oxide was 47.63% by weight of cerium oxide, 50.20% by weight of zirconium oxide, 0.59% by weight of hafnium oxide and 1.58% by weight of yttrium oxide.

Example 6

24.0 g of cerium oxide manufactured by SANTOKU METAL INDUSTRY CO., LTD. with a purity of 99.9%, 25.6 g of zirconium oxide containing 1.17% by weight of hafnium oxide manufactured by SANTOKU METAL INDUSTRY CO., LTD. with a purity of 98.83%, and 0.4 g of commercially available calcium oxide with a purity of 99.9% were mixed together in a ball mill. The resulting mixture was molded to give pellets by a compression molding device under a molding pressure of 500 kg/cm². The resulting pellets were sintered in atmosphere at 1500° C. for five hours. The pellets were crushed in a ball mill to give a primary composite oxide. The primary composite oxide thus produced was charged in a vacuum heating oven which was then evacuated to vacuum. The composite oxide was then heated to and maintained at 900° C. for one hour as a pure oxygen gas was introduced for removing impurities affixed thereto. After the temperature was lowered to 100° C., the oven was again evacuated to vacuum. After the oxygen gas was removed and an argon gas-diluted 10% hydrogen gas was introduced, the composite oxide was heated at 1000° C. for 5 hours. The temperature was then lowered to 600° C. After evacuating the oven to vacuum, an oxygen gas was introduced into the heating oven and heating was then carried out at 600° C. for 5 hours for synthesizing the composite oxide.

Figure 4:
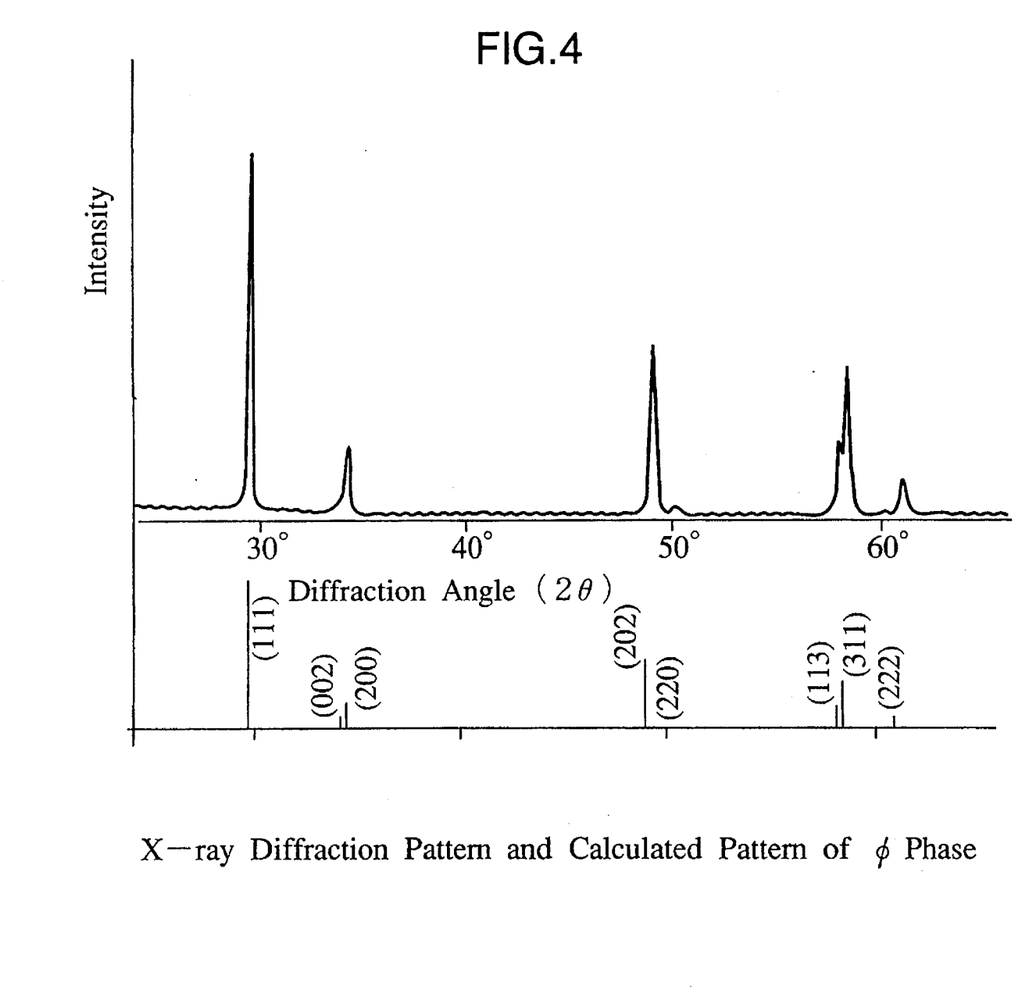
FIG. 4 is a graph showing an X-ray diffraction pattern of the primary composite oxide synthesized in the Example 6 and calculated pattern of the Φ phase.

The oxygen absorbing and desorbing properties were measured of the produced composite oxide in the same way as in Example 1. Analyses of the crystal structure conducted in the same way as in Example 1 showed the presence of Φ' phase. The results are shown in Table 1. An X-ray diffraction conducted by way of comparison on the primary composite oxide, indicated the presence of Φ' phase, without indicating the presence of Φ' phase. The results are shown in FIG. 4. Comparison of FIG. 3 with FIG. 4 revealed that the Φ' phase was a phase different from the Φ' phase. The composition of the composite oxide was 48.02% by weight of cerium oxide, 50.60% by weight of zirconium oxide, 0.59% by weight of hafnium oxide and 0.79% by weight of calcium oxide.

Comparative Examples 1 and 2

Figure 5:
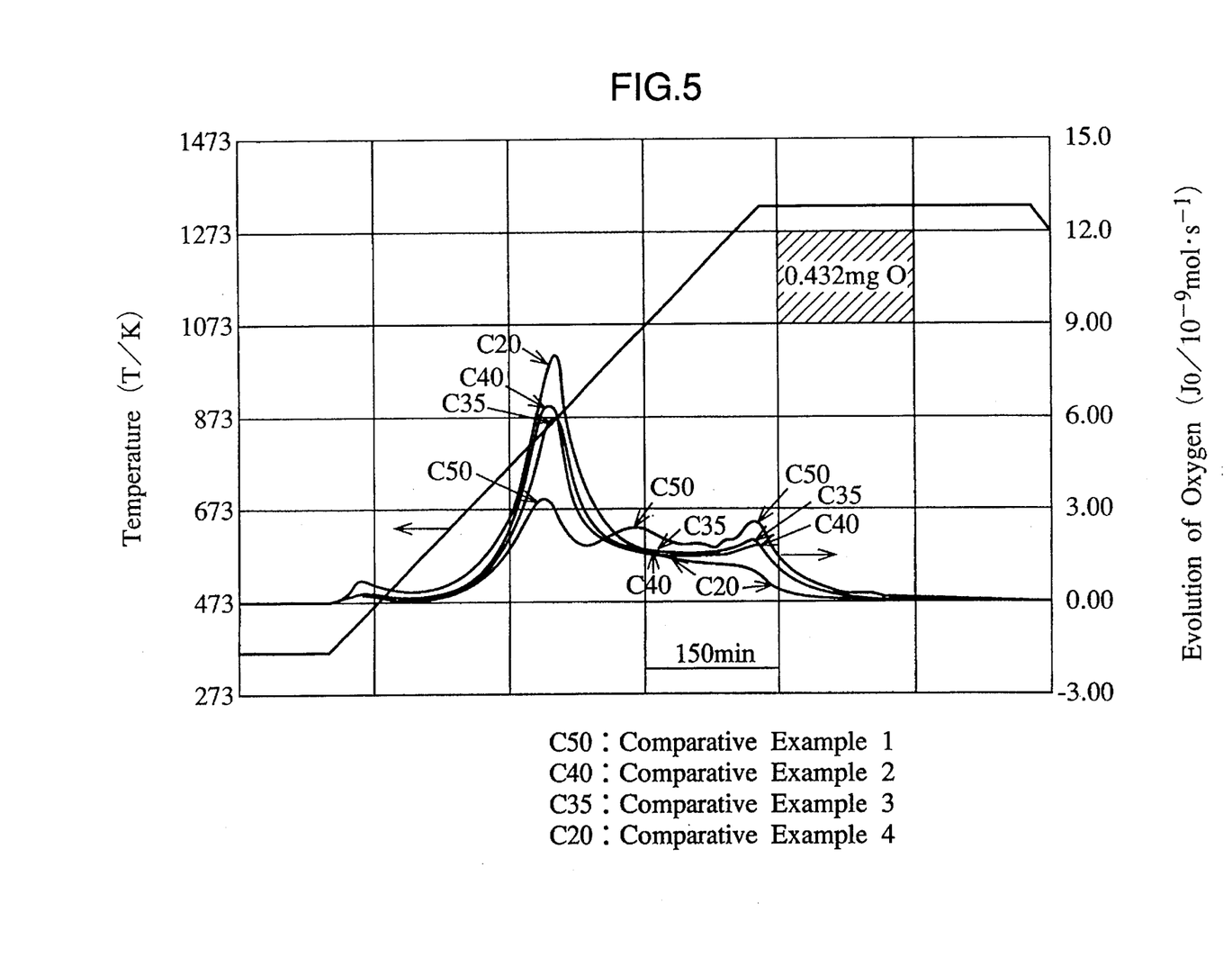
FIG. 5 is a graph showing the oxygen absorbing and desorbing capability of the composite oxides synthesized in the Comparative Examples 1 to 4.
Figure 6:
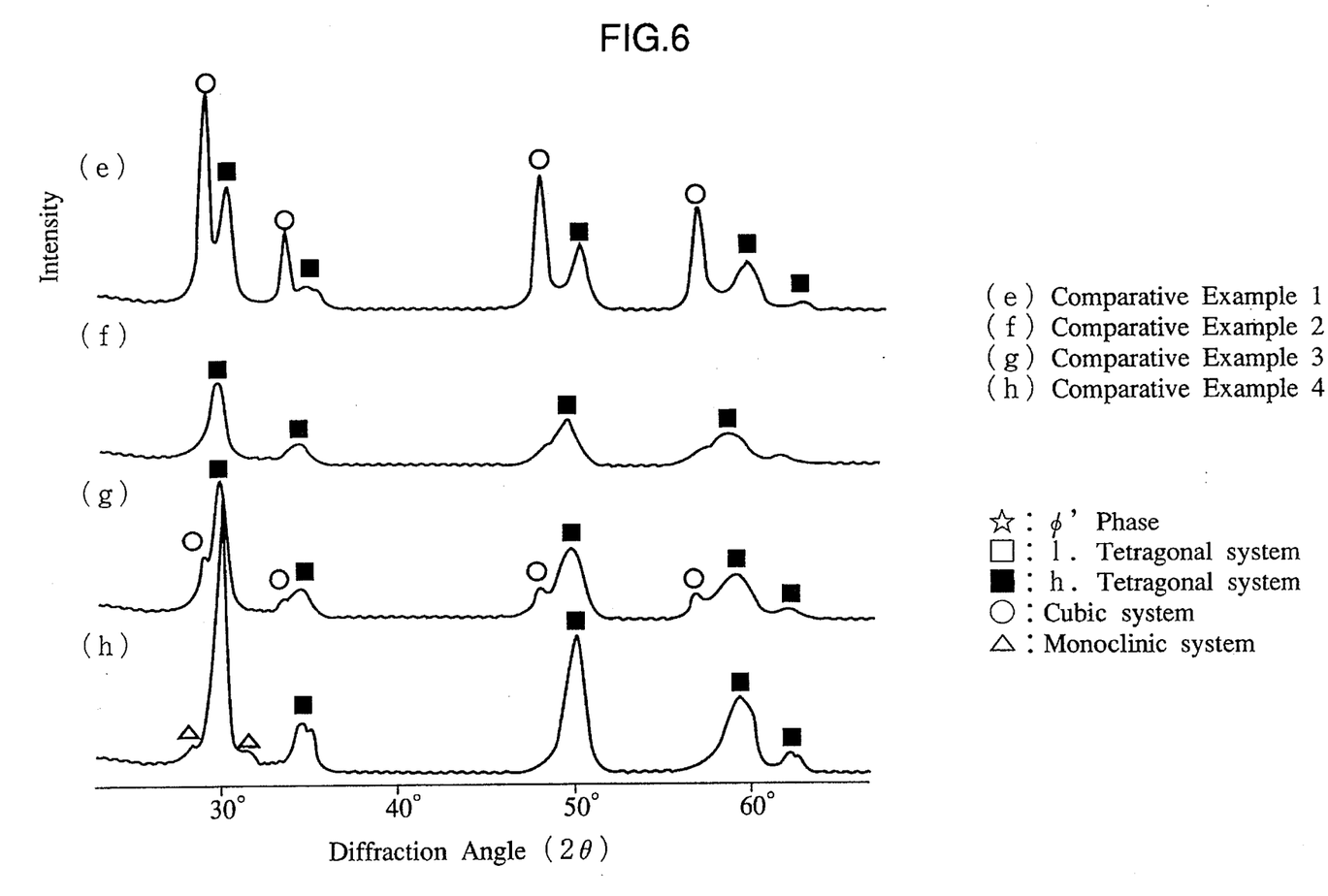
FIG. 6 is a graph showing X-ray diffraction patterns of the composite oxides synthesized in Comparative Examples 1, 2, 3 and 4, respectively.

X-ray diffraction and measurements of oxygen absorbing and desorbing properties were conducted of the primary composite oxides prepared in Examples 1 and 2 and not subjected to heating-deoxidation and heating-oxidation. The results are shown in FIGS. 5 and 6 (see C50 and C40 in FIG. 5 and (e) and (f) in FIG. 6) and in Table 1.

comparative Examples 3 and 4

X-ray diffraction and measurements of oxygen absorbing and desorbing properties were conducted of the primary composite oxides prepared in Examples 3 and 4 and not subjected to heating-deoxidation and heating-oxidation. The results are shown in FIGS. 5 and 6 (see C35 and C20 in FIG. 5 and (g) and (h) in FIG. 6) and in Table 1.

TABLE 1

| | Composition (wt. % of oxide) | | | | | Oxygen absorbing and desorbing capability |
|---|---|---|---|---|---|---|
| | Ce | Zr | Hf | Ca | Y | Oxygen μmol/g |
| Ex. 1 | 58.16 | 41.35 | 0.49 | — | — | 1,112 |
| Ex. 2 | 48.10 | 51.30 | 0.60 | — | — | 1,073 |
| Ex. 3 | 42.81 | 56.52 | 0.67 | — | — | 1,009 |
| Ex. 4 | 25.79 | 73.35 | 0.86 | — | — | 638 |
| Ex. 5 | 47.63 | 50.20 | 0.59 | — | 1.58 | 1,053 |
| Ex. 6 | 48.02 | 50.60 | 0.59 | 0.79 | — | 1,071 |
| Comp. Ex. 1 | 58.16 | 41.35 | 0.49 | — | — | 463 |
| Comp. Ex. 2 | 48.10 | 51.30 | 0.60 | — | — | 655 |
| Comp. Ex. 3 | 42.81 | 56.52 | 0.67 | — | — | 516 |
| Comp. Ex. 4 | 25.79 | 73.35 | 0.86 | — | — | 408 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A composite oxide having oxygen absorbing and desorbing capability, which comprises 4.99–98.99% by weight of cerium oxide, 1–95% by weight of zirconium oxide and 0.01–20% by weight of hafnium oxide, the composite oxide including Φ' phase as a crystal phase and having oxygen absorbing and desorbing capability of at least 100 μmol/g at 400° to 700° C.

2. The composite oxide according to claim 1, wherein the composite oxide contains an additional metal oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, and mixtures thereof in an amount up to 10% by weight based upon a total weight of the composite oxide.

3. The composite oxide according to claim 1 wherein the composite oxide has an oxygen absorbing and desorbing capability of 100 to 1200 μmol/g at 400° to 700° C.

4. The composite oxide according to claim 1 wherein the Φ' phase has a structure comprised of eight units of $CaF_2$-related structure and a lattice parameter equal to about twice a lattice parameter of a crystal structure not having the Φ' phase.

5. The composite oxide according to claim 1 wherein the Φ' phase is a crystal phase having peaks in (222), (400), (440), (622) and (444) planes of X-ray diffraction pattern.

6. The composite oxide according to claim 5 wherein the Φ' phase is a crystal phase having peaks in (331), (333) and (511) planes of X-ray diffraction pattern.

* * * * *